US008620152B1

(12) United States Patent
Martin

(10) Patent No.: US 8,620,152 B1
(45) Date of Patent: Dec. 31, 2013

(54) AUXILIARY LENS POSITIONING SYSTEM FOR PORTABLE CAMERAS

(76) Inventor: Rex Martin, Davenport, FL (US)

(*) Notice: Subject to any disclaimer, the term of this patent is extended or adjusted under 35 U.S.C. 154(b) by 0 days.

(21) Appl. No.: 13/292,859

(22) Filed: Nov. 9, 2011

(51) Int. Cl.
G03B 19/12 (2006.01)
G02B 15/10 (2006.01)

(52) U.S. Cl.
USPC ............ 396/544; 248/121; 396/419; 396/427

(58) Field of Classification Search
USPC .............. 248/121–127, 154, 178.1, 200, 694;
359/803, 815, 819, 822, 827, 829;
396/71, 419, 422, 428, 544
See application file for complete search history.

(56) References Cited

U.S. PATENT DOCUMENTS

| | | | | |
|---|---|---|---|---|
| 2,732,751 A | * | 1/1956 | Heidecke et al. ............ | 396/530 |
| 3,133,719 A | * | 5/1964 | Beck ........................... | 248/316.1 |
| 4,739,801 A | * | 4/1988 | Kimura et al. ............... | 138/120 |
| 4,836,668 A | * | 6/1989 | Christianson ................ | 359/512 |
| 4,856,822 A | * | 8/1989 | Parker .......................... | 285/62 |
| 4,893,143 A | * | 1/1990 | Sheng-Huei ................. | 396/530 |
| D307,286 S | * | 4/1990 | Ginder ......................... | D16/242 |
| 5,033,528 A | * | 7/1991 | Volcani ........................ | 160/351 |
| D321,062 S | * | 10/1991 | Bonbright .................... | D26/140 |
| 5,276,596 A | * | 1/1994 | Krenzel ....................... | 362/191 |
| 5,299,067 A | * | 3/1994 | Kutz et al. ................... | 359/827 |
| 5,449,206 A | * | 9/1995 | Lockwood ................... | 285/261 |
| D376,380 S | * | 12/1996 | Yang et al. ................... | D16/242 |
| 5,835,289 A | * | 11/1998 | Berry ........................... | 359/822 |
| 6,042,155 A | * | 3/2000 | Lockwood ................... | 285/264 |
| 6,352,227 B1 | * | 3/2002 | Hathaway .................... | 248/160 |
| 6,889,006 B2 | * | 5/2005 | Kobayashi ................... | 396/6 |
| D508,063 S | * | 8/2005 | Yip et al. ..................... | D16/135 |
| 7,390,130 B2 | * | 6/2008 | Soulvie ........................ | 396/419 |
| 7,533,906 B2 | * | 5/2009 | Luettgen et al. ............ | 285/146.1 |
| 7,665,698 B2 | * | 2/2010 | Desorbo et al. ............. | 248/187.1 |
| 7,871,205 B2 | * | 1/2011 | Inoue ........................... | 396/422 |
| 7,891,615 B2 | | 2/2011 | Bevirt | |
| 8,087,836 B2 | | 1/2012 | Bevirt | |
| 8,197,149 B2 | * | 6/2012 | Darrow ........................ | 396/428 |
| 8,388,243 B1 | * | 3/2013 | Smith ........................... | 396/422 |
| 2005/0099526 A1 | * | 5/2005 | Wu et al. ...................... | 348/360 |
| 2007/0081817 A1 | * | 4/2007 | Soulvie ......................... | 396/419 |
| 2008/0251662 A1 | * | 10/2008 | Desorbo et al. ............. | 248/178.1 |
| 2008/0267613 A1 | * | 10/2008 | Darrow ........................ | 396/428 |
| 2010/0078536 A1 | * | 4/2010 | Galvin ......................... | 248/231.51 |
| 2010/0252696 A1 | * | 10/2010 | Sage ............................. | 248/160 |
| 2010/0314508 A1 | * | 12/2010 | Bevirt et al. ................. | 248/121 |
| 2011/0038064 A1 | * | 2/2011 | Xhunga ........................ | 359/811 |
| 2012/0106944 A1 | * | 5/2012 | Johnson ........................ | 396/428 |
| 2012/0288269 A1 | * | 11/2012 | Jensen ........................... | 396/428 |
| 2013/0175413 A1 | * | 7/2013 | Waugh ......................... | 248/124.1 |

OTHER PUBLICATIONS

Lockwood Products, http://www.loc-line.com; Lake Oswego, OR; Oct. 23, 1999.*

* cited by examiner

Primary Examiner — Clayton E Laballe
Assistant Examiner — Kevin Butler
(74) Attorney, Agent, or Firm — Gold & Rizvi, P.A.; H. John Rizvi

(57) ABSTRACT

An auxiliary lens positioning system for use with portable cameras is disclosed which includes a base member, an elongate flexible member, a lens mounting flange, an auxiliary lens and a retention member. The elongate flexible member extends from one end of the base member and includes a lens mounting flange at the opposing end. The auxiliary lens may be either removably coupled to the lens mounting flange of the elongate flexible member or permanently coupled therewith. The elongate flexible member may comprise a plurality of interconnected ball and socket segments. The base member may further include a first and second clamping member for engaging the external surfaces of a portable camera.

16 Claims, 4 Drawing Sheets

AUXILIARY LENS POSITIONING SYSTEM FOR PORTABLE CAMERAS

FIELD OF THE INVENTION

The present disclosure generally relates to photographic equipment. More particularly, the present disclosure relates to an auxiliary lens positioning system for use with portable cameras.

BACKGROUND OF THE INVENTION

History has shown that photography has been an enjoyable and productive pastime for many years. Both professional photographers and amateur enthusiasts use various types of cameras to partake in capturing pictures. The professional photographer usually has a substantial investment in commercial grade photographic equipment which provides the professional with enhanced functionality and increased reliability. However, the commercial grade equipment is generally very expensive and outside of the budget for the typical hobbyist or amateur photographer.

The photographic equipment an amateur photographer usually employs is capable of capturing photographic images but is frequently limited in various features and functionality. Typical amateur cameras include point-and-shoot cameras, mobile phones, internet based cameras, video cameras and the like. Such cameras, particularly non-professional grade, are generally manufactured without various features such as interchangeable lenses or mechanical structure that permits coupling of auxiliary lenses to the primary lens of the amateur camera. Frequently an amateur photographer desires to capture an image that either requires the use of an auxiliary lens or would be dramatically enhanced by use of the auxiliary lens. For example, the amateur may desire to alter the field-of-view of the image (zoom-in or zoom-out), alter the photographic spectrum of the captured image, and apply special effects or combinations thereof. The use of an auxiliary lens enables the camera to capture an image with the desired effect of optical variation offered by the additional lens or filter. One such preference may be to employ a wide angle to capture the full view of a large mountain range, or conversely, a narrow angle, which is preferred to enlarge distant objects such as a bird in a tall tree. Another possible preference may be to apply a spectrum filter to alter the colors or contrast of the captured image, such as a filter that blocks ultraviolet light. To capture a field of view different from what the built in lens of a general camera allows, an additional lens may be placed in front of the built in lens when the imaged is captured. In these situations, the amateur photographer is usually unable to employ such filters or auxiliary lenses because the basic camera is lacking mechanical attachment provisions for coupling the auxiliary lens to the primary lens of the camera.

There are a few known devices in the prior art that attempt to aid the amateur photographer in the ability to use auxiliary lenses. These devices are commonly provided by the manufacturer of the specific camera being used. One known solution provides a platform having a housing that snaps over the camera face. The housing has a built-in lens that is positioned in front of the primary lens of the camera. While this known solution is somewhat useful, it presents substantial drawbacks. Firstly, this device is of proprietary configuration and is not usable with other camera models the amateur may desire to use. Secondly, this device during use frequently blocks access to other features, sensors or controls of the camera. Also, the device may cause the user to have an awkward grip on the camera. Finally, due to the altered grip on the camera induced by the use of this known device, there is an increased potential risk that the user may drop the camera thereby damaging the photographic equipment.

Another known solution provides an intermediary device that couples to the camera utilizing a clamping mechanism and a rigging structure to position the auxiliary lens. The rigging structure generally includes a series of slidably adjustable members that are retained in position with respect to one another by way of multiple screws and knobs. While this known solution is somewhat useful, it presents substantial drawbacks. To begin, the device uses a complex rigging structure that requires the user to make several adjustments by loosening, positioning and tightening the screws/knobs of the rigging to thereby appropriately position the auxiliary lens. Consequently, the setup and use of this device is very time consuming and detracts from the photographic experience. Further, in the time that the user is adjusting the rigging, photographic conditions may have adversely changed and the desired picture is no longer available. Next, this device is also likely to prevent user access to various controls of the camera. Importantly, this device significantly adds bulky structure to the camera and may adversely affect the ability of the user to securely grasp the camera during use. Also, due to the physical size and complexity of using this known device a user may be discouraged from carrying the large device around while photographing people, places, animals etc.

In still another known solution, a barrel clamp is provided that is designed to clamp around the cylindrical portion of a protruding primary camera lens. While this known solution is somewhat useful, it presents substantial drawbacks. Initially, this device can only be used with cameras that have a protruding lens to which the clamp may be affixed. However, many basic level cameras do not have a protruding lens thereby making this solution ineffective with respect to these cameras. On cameras that do have a protruding lens barrel to which this device may be clamped, repetitive use of this known device is likely to damage the outer surface of the camera lens. For example, if the barrel clamp is over tightened, the mechanical structure of the camera lens may be damaged resulting in inoperability of the camera lens. Further, repetitive use of this device may scratch or mar the outer surface of the camera lens decreasing the aesthetic appearance of the camera.

Efforts to provide an auxiliary lens positioning system for use with portable cameras that overcomes the drawbacks in the prior art have not met with significant success to date. As a result, there is a need in the art for an auxiliary lens positioning system that provides quick adjustability/deployment, portability, adaptable to many camera form factors, does not interfere with other camera features, and permits a secure hold on the camera.

SUMMARY OF THE INVENTION

The basic inventive concept provides an auxiliary lens positioning system that permits a user to employ auxiliary/secondary lenses for use with a primary lens of a portable camera.

From an apparatus aspect, the invention comprises an auxiliary lens positioning apparatus for use with a portable camera including a base member with a first end, a second end, a top surface, an opposing bottom surface and an aperture formed through the top surface and the bottom surface. The aperture is positioned adjacent the first end. An elongate flexible member having a first end and an opposing second end, the first end coupled to the top surface of the base member and adjacent to the second end of the base member.

A lens mounting flange coupled to the second end of the elongate flexible member. A retention member having a threaded protrusion configured to pass through the aperture, such that the retention member is further configured to mechanically couple the base member to the camera.

From a first system aspect, an auxiliary lens positioning system is disclosed comprising a base member having a first end, a second end, a top surface, an opposing bottom surface and an aperture formed through the top surface and the bottom surface and positioned adjacent the first end. An elongate flexible member having a first end and an opposing second end, the first end coupled to the top surface of the base member and adjacent to the second end of the base member. A lens mounting flange coupled to the second end of the elongate flexible member. A retention ring coupled to the mounting flange, the retention ring having an internally threaded surface. A retention member having a threaded protrusion configured to pass through the aperture, wherein the retention member is further configured to mechanically couple the base member to the camera.

From a second system aspect, an auxiliary lens positioning system is disclosed comprising a base member having a first end, a second end, a top surface, an opposing bottom surface and an elongate slot formed through the top surface and the bottom surface and positioned adjacent the first end. An elongate flexible member having a first end and an opposing second end, the first end coupled to the top surface of the base member and adjacent to the second end of the base member. A lens mounting flange coupled to the second end of the elongate flexible member. A retention ring coupled to the mounting flange, the retention ring having an internally threaded surface. A first clamping member slidably coupled adjacent to the first end and along the top surface of the base member by a retention member having a threaded protrusion configured to pass through the elongate slot and engage a corresponding threaded aperture formed into the first clamping member. A second clamping member coupled adjacent to the second end of the base member and along the top surface of the base member, wherein the first and second clamping members are configured to mechanically couple the base member to the camera.

For a fuller understanding of the nature and advantages of the present invention, reference should be made to the ensuing detailed description of the preferred embodiments taken in conjunction with the accompanying.

BRIEF DESCRIPTION OF THE DRAWINGS

The components in the figures are not necessarily to scale, emphasis instead being placed upon illustrating the principles of the invention. The invention will now be described, by way of example, with reference to the accompanying drawings, in which.

DETAILED DESCRIPTION OF THE PREFERRED EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. In other implementations, well-known features and methods have not been described in detail so as not to obscure the invention. For purposes of description herein, the terms "upper", "lower", "left", "right", "front", "back", "vertical". "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments that may be disclosed herein are not to be considered as limiting, unless the claims expressly state otherwise.

Figure 1:
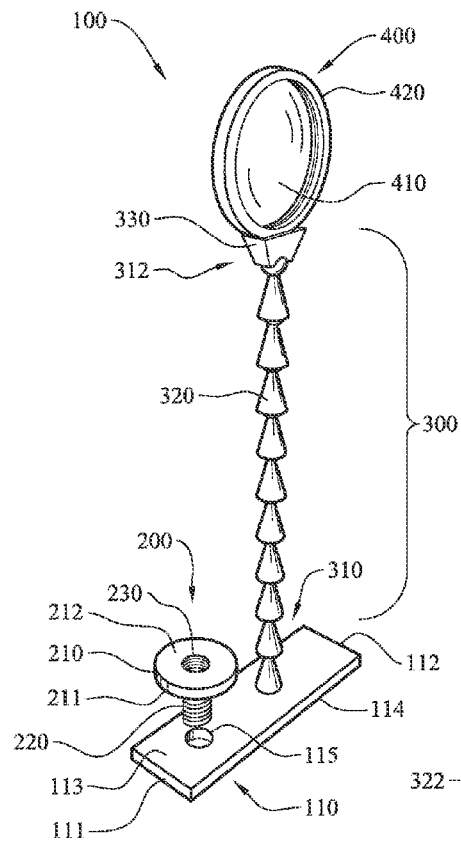
FIG. 1 is a perspective view of an exemplary embodiment of an auxiliary lens positioning system in accordance with the present invention.

Reference is now made to FIG. 1, which illustrates an exemplary embodiment of an auxiliary lens positioning system 100. The auxiliary lens positioning system 100 includes a base member 110, a retention member 200, an elongate flexible member 300 and an auxiliary lens 400. Base member 110 is generally configured as a rectangular bar having a first end 111, a second end 112, a top surface 113, an opposing bottom surface 114 and an aperture 115 adjacent to the first end 111. Retention member 200 generally comprises a knob 210 and a threaded protrusion 220 extending from a bottom surface 211 of knob 210. Knob 210 further includes a top surface 212 opposite bottom surface 211 and centrally formed into knob 210 top surface 212 is a threaded recess 230. Threaded recess 230 is configured to accept a corresponding threaded member of a tripod or other camera mounting device (not shown). Aperture 115 of base member 110 is configured to receive threaded protrusion 220 of retention member 200 such that threaded protrusion 220 extends beyond bottom surface 114 of base member 110. Base member 110 may be fabricated from one of many suitable materials such as plastic, metal, alloys, composites, and laminates by employing manufacturing processes suitable for such materials. It is noted that one of ordinary skill in the art would readily appreciate these various manufacturing processes and materials, which are not described in detail herein so as not to obscure the invention.

Continuing, elongate flexible member 300 is configured with a first end 310, a second end 312 and comprises a plurality of ball and socket segments 320 joined end-to-end to form a user positionable elongate member. Ball and socket segments 320 provide a formable member that may be deformed into various curved shapes such that auxiliary lens 400 may be positioned with respect to a primary lens of a camera. The specific structure of segments 320 is discussed in greater detail below with respect to FIGS. 2 and 3. First end 310 of elongate flexible member 300 is coupled adjacent to second end 112 of base member 110 and extends outwardly from top surface 113. First end 310 may be coupled by employing known manufacturing methods such as, but not limited to, bonding, mechanical fastening (screws, pins, rivets), press-fit, snap-fit or combinations thereof. In one embodiment, there is a protrusion (not shown) that extends outwardly from top surface 113 that is configured to press into a mating recess formed in first end 310 of elongate flexible member 300. Second end 312 of elongate flexible member 300 is configured to couple with auxiliary lens 400 by way of lens mounting flange 330. Auxiliary lens 400 generally comprises a lens element 410 of either glass, plastic or other polymer material. Lens element 410 may be convex, concave, tinted, textured or other configuration to thereby provide various photographic enhancements and/or effects. Auxiliary lens 400 further includes a circumferential ring member 420 that provides structural support to lens element 410. Ring member 420 may be coupled to lens mounting flange 330 of elongate flexible member 300 by various manufacturing methods such as riveting, pinning, bonding, press-fit, snap-fit, molding, or other mechanical fastening means.

Figure 2:
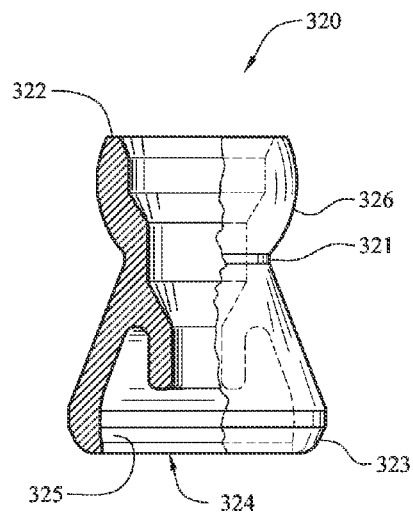
FIG. 2 is a partial cross-sectional view of a single ball and socket joint in accordance with the present invention.
Figure 3:
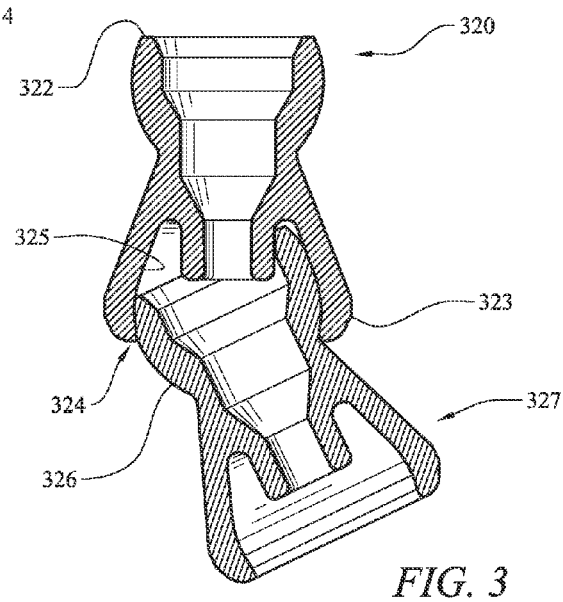
FIG. 3 a cross-sectional view of multiple ball and socket joints in accordance with the present invention.

In one exemplary embodiment, the elongate flexible member 300 generally comprises a plurality of interconnected ball and socket segments 320 which are illustratively detailed in FIGS. 2 and 3. Specifically, FIG. 2 depicts a single ball and socket segment 320 having a main central body 321 of radial symmetry including a ball-end portion 322 generally comprising a sphere-shape at one end of the central body and a socket-end portion 323 opposite the ball-end portion 322. The ball-end portion 322 has a diameter greater than that of the central body at the attachment point to which it is constructed. The socket-end portion 323 generally comprises a conical shape having a concaved recess 324 formed within the conical base. The recess 324 has a diameter substantially similar to the ball-end portion 322 and configured to receive ball-end portion 322 therein. Recess 324 is further configured having an interior surface area 325 that provides frictional surface friction between the interior surface area 325 and an exterior surface area 326 of ball-end portion 322. As shown in FIG. 3, when the ball-end portion 322 is removably inserted into the socket-end portion 323, there is provided substantial frictional contact between the mating outer surface 326 and the inner surface 325 such that these permanent frictional forces function as the retaining means to hold one ball and socket 320 at any desired location relative to an adjacent interconnected ball and socket segment 327. It is contemplated that the geometric configuration of ball and socket segments 320 and 327 be configured such that the frictional forces are sufficient to resist positional change caused by general forces acting upon the device such as gravity or user movement of the auxiliary lens positioning system 100 and associate camera. However, it is further contemplated that the frictional forces may be overcome by the general strength of the user as desired to position auxiliary lens 400 with respect to the primary lens of the camera being used. Recess 324 is geometrically configured to permit interconnected ball and socket segments 320 to be positioned relative to each other such that their longitudinal axes are either in or out of alignment, and permits unrestricted relative rotational movement there between. In one exemplary embodiment, each ball and socket segment 320 of the elongate flexible member 300 is constructed of polymeric material. The elongate flexible member 300 may be comprised of segments of the type marketed by Lockwood Products Inc. under the trade designation LOC-LINE, or a flexible tubing of similar function.

Figure 4:
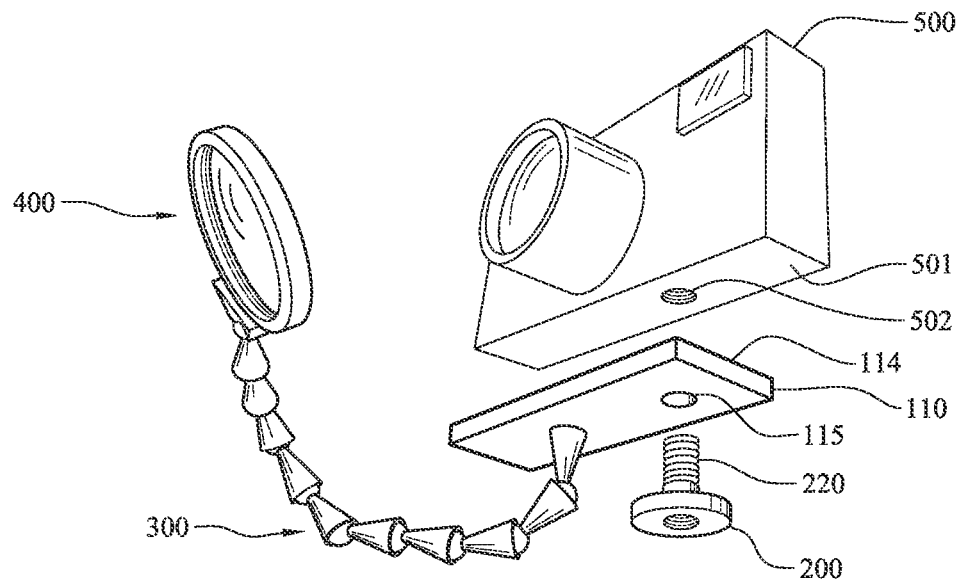
FIG. 4 is an exploded perspective view taken from below of the auxiliary lens positioning system and a camera in accordance with the present invention.
Figure 5:
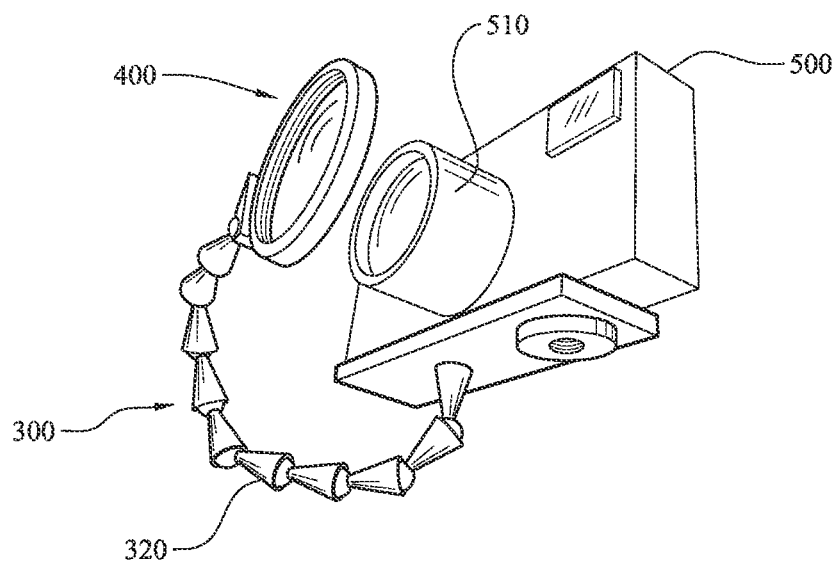
FIG. 5 is a perspective view taken from below of the auxiliary lens positioning system and a camera in accordance with the present invention.

During operation, and referring to FIGS. 4 and 5, auxiliary lens positioning system 100 is positioned below a camera 500 such that the bottom surface 501 of camera 500 is facing the bottom surface 114 of base member 110. Additionally, aperture 115 of base member 110 is coaxially aligned with a camera mounting aperture 502 of the camera 500. The threaded protrusion 220 of retention member 200 is passed through aperture 115 and threadably engages camera mounting aperture 502 of the camera 500. Retention member 200 is then tightened to provide adequate coupling of base member 110 to the camera 500. In further operation of the present invention, and shown in FIG. 5, auxiliary lens 400 is positioned in front of and in coaxial alignment with primary lens 510 of camera 500. The positioning of auxiliary lens 400 is effectuated by moving and positioning ball and socket segments 320 of elongate flexible member 300 such that desired coaxial alignment is achieved between auxiliary lens 400 and primary lens 510. Once the positioning of auxiliary lens 400 is accomplished the frictional forces provided by ball and socket segments 320, as described above, retain the alignment and prevent undesired positional change due to gravity or camera movement. The user may now employ the camera 500 to compose and capture pictures as desired.

Figure 6:
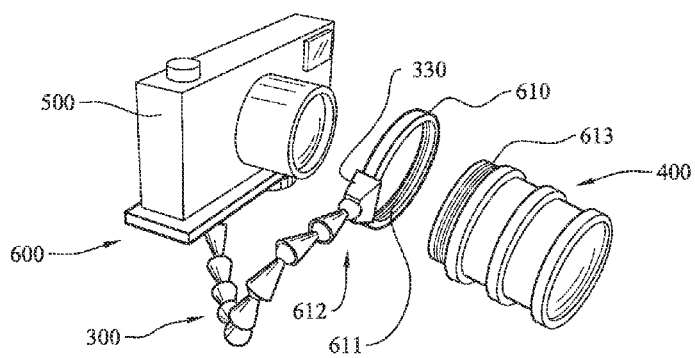
FIG. 6 is an exploded upper perspective view of the auxiliary lens positioning system, a removable multi-element lens and a camera in accordance with the present invention.
Figure 7:
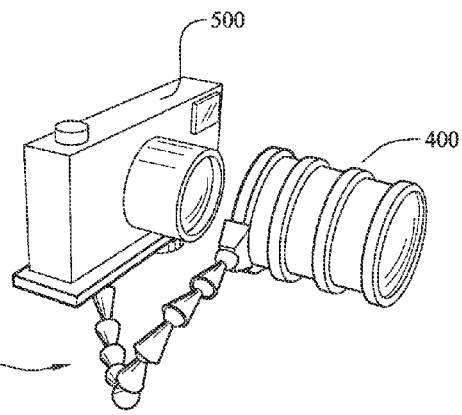
FIG. 7 is an upper perspective view of the auxiliary lens positioning system, a removable multi-element lens coupled to the system and a camera in accordance with the present invention.
Figure 8:
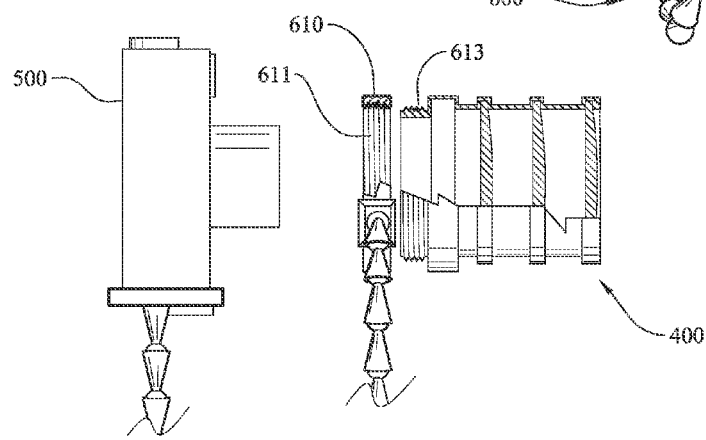
FIG. 8 is a side view of FIG. 7 and partial cross-sectional view of the multi-element lens in accordance with the present invention.

An alternate exemplary embodiment of the present invention is illustrated in FIGS. 6, 7 and 8. In this alternate embodiment, auxiliary lens positioning system 600 is configured in generally the same manner as discussed above, however, the auxiliary lens positioning system 600 further includes a retention ring 610 coupled to a second end 612 of elongate flexible member 300 by way of lens mounting flange 330. Retention ring 610 is configured having an internally threaded surface 611 that operatively couples with an exterior threaded surface 613 of an auxiliary lens 400. It is contemplated that this alternate exemplary embodiment will provide a user with the capability to use interchangeable auxiliary lens 400 to produce various visual effects. For example, auxiliary lens 400 may be configured as a plurality of auxiliary lens 400 coupled together to produce a desired effect such as increasing the field of view and removing ultraviolet light. In other embodiments a single multi-element auxiliary lens 400 may be employed to alter the field of view, color balance, contrast etc. of the final photograph. In operation, the externally threaded surface 613 of auxiliary lens 400 is coupled with the internally threaded surface 611 of retention ring 610 such that auxiliary lens 400 is securely retained with auxiliary lens positioning system 600. The mounting and positioning of auxiliary lens positioning system 600 is then performed as described above with respect to FIGS. 4 and 5.

Figure 9:
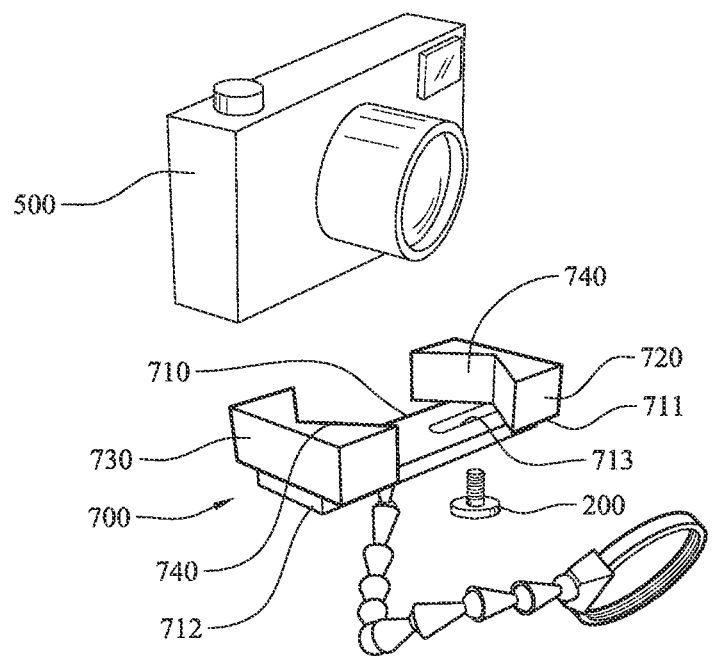
FIG. 9 is an exploded perspective view taken from above of an alternate embodiment of the auxiliary lens positioning system having an adjustable clamping base member in accordance with the present invention.
Figure 10:
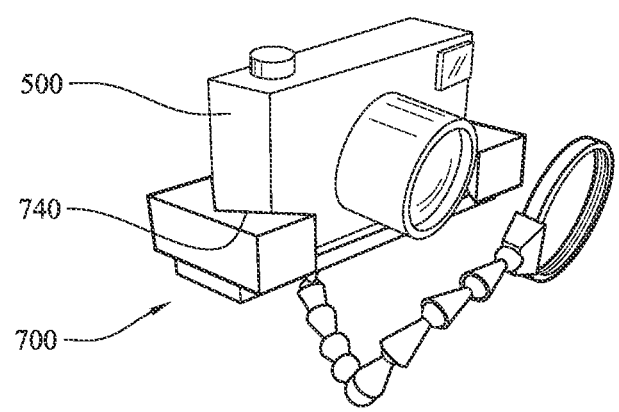
FIG. 10 is a perspective view taken from above of an alternate embodiment of the auxiliary lens positioning system having an adjustable clamping base member in accordance with the present invention In the figures, like reference numerals designate corresponding elements throughout the different views of the drawings.

Reference is now made to FIGS. 9 and 10 which illustrate another alternate embodiment of the present invention. In this exemplary embodiment, auxiliary lens positioning system 700 includes an adjustable base member 710 that permits coupling of the auxiliary lens positioning system 700 to a camera 500 that is devoid of a camera mounting aperture such as a disposable camera or cell phone. Base member 710 generally includes a first clamping member 720 that is slidably coupled to a first end 711 of base member 710. Further, base member 710 has a second clamping member 730 that is coupled to a second end 712 of base member 710. Formed adjacent to first end 711 is a slot 713 through which retention member 200 may be inserted into a corresponding threaded aperture (not shown) formed into a bottom surface of first clamping member 720. The slidable movement of first clamping member 720 with respect to the fixed second clamping member 730 provides for adjustable spacing between first and second clamping members 720 and 730 such that various camera 500 form factors (sizes) may be used with the auxiliary lens positioning system 700. The first and second clamping members may be fabricated from plastic, resin, alloys, rubber or other suitable materials that provide sufficient clamping functionality. In operation, and illustrated in FIG. 10, the camera 500 is positioned between the first and second clamping member 720 and 730 and is securely retained therewith by opposing V-shaped groves 740 formed within opposing surfaces of first and second clamping members 720 and 730. V-shaped groves 740 provide automatic longitudinal/horizontal centering of the camera 500 with respect to auxiliary lens positioning system 700. In further operation, auxiliary lens positioning system 700 is utilized in similar fashion as described above with respect to FIGS. 4 through 8.

As will be now apparent to those skilled in the art, auxiliary lens positioning system fabricated according to the teachings of the present invention are capable of substantially enhancing photographic capability of a basic camera. Since the present invention provides an adjustable platform that permits free multi-directional positioning of an auxiliary lens with respect to a primary lens of a camera the images captured by the camera may be enhanced as desired by the user. In addition, the invention provides a platform that further permits use of multiple auxiliary lenses that are releasably coupled to the auxiliary lens positioning system.

Although the above provides a full and complete disclosure of the preferred embodiments of the invention, various modifications, combinations, alternate constructions and equivalents will occur to those skilled in the art. For example, although the invention has been described with reference to an elongate flexible member comprising a plurality of ball and socket segments, alternatively the elongate flexible member may be fabricated from a deformable member such as a spiral-formed rod configured for bendable operation by the user. It is intended that all matters in the foregoing description and shown in the accompanying drawings be interpreted as illustrative and not in a limiting sense. Therefore the above should not be construed as limiting the invention, which is defined by the appended claims and their legal equivalence.

What is claimed is:

1. An auxiliary lens positioning apparatus for use with a portable camera comprising:
    a base member having a first end, a second end, a top surface, an opposing bottom surface and an aperture formed through said top surface and said bottom surface and positioned adjacent said first end;
    an elongate flexible member having a first end and an opposing second end, said first end coupled to said top surface of said base member and adjacent to said second end of said base member and a plurality of ball and socket segments located between said first end and said opposing second end;
    a lens mounting flange coupled to said second end of said elongate flexible member;
    an auxiliary lens carried by said lens mounting flange, wherein said auxiliary lens is configured to one of:
        increase a field of view of the camera, and
        decrease a field of view of the camera; and
    a retention member having a threaded protrusion configured to pass through said aperture, wherein said retention member is further configured to mechanically couple said base member to the camera.

2. An auxiliary lens positioning apparatus as recited in claim 1, further comprising an auxiliary lens coupled to said lens mounting flange.

3. An auxiliary lens positioning apparatus as recited in claim 2, wherein said auxiliary lens is releasably coupled to said lens mounting flange.

4. An auxiliary lens positioning apparatus as recited in claim 1, wherein said plurality of ball and socket segments are interconnected such that a ball of one segment is inserted into a socket of an adjacent segment and frictional forces between an exterior surface area of said ball and an interior surface of said socket are sufficient to retain a relative position between said plurality of ball and socket segments.

5. An auxiliary lens positioning system for use with a portable camera comprising:
    a base member having a first end, a second end, a top surface, an opposing bottom surface and an aperture formed through said top surface and said bottom surface and positioned adjacent said first end;
    an elongate flexible member having a first end and an opposing second end, said first end coupled to said top surface of said base member and adjacent to said second end of said base member;
    a lens mounting flange coupled to said second end of said elongate flexible member;
    a retention ring coupled to said mounting flange, said retention ring having an internally threaded surface;
    an auxiliary lens having an exterior threaded surface, said auxiliary lens being threadably coupled to said retention ring; and
    a retention member having a threaded protrusion configured to pass through said aperture, wherein said retention member is further configured to mechanically couple said base member to the camera.

6. An auxiliary lens positioning system as recited in claim 5, wherein said auxiliary lens is a multi-element lens assembly.

7. An auxiliary lens positioning system as recited in claim 5, wherein said auxiliary lens is configured to increase a field of view of the camera.

8. An auxiliary lens positioning system as recited in claim 5, wherein said auxiliary lens is configured to decrease a field of view of the camera.

9. An auxiliary lens positioning system as recited in claim 5, wherein said elongate flexible member comprises a plurality of ball and socket segments.

10. An auxiliary lens positioning system as recited in claim 9, wherein said plurality of ball and socket segments are interconnected such that a ball of one segment is inserted into a socket of an adjacent segment and frictional forces between an exterior surface area of said ball and an interior surface of said socket are sufficient to retain a relative position between said plurality of ball and socket segments.

11. An auxiliary lens positioning system for use with a portable camera comprising:
- a base member having a first end, a second end, a top surface, an opposing bottom surface and an elongate slot formed through said top surface and said bottom surface and positioned adjacent said first end;
- an elongate flexible member having a first end and an opposing second end, said first end coupled to said top surface of said base member and adjacent to said second end of said base member;
- a lens mounting flange coupled to said second end of said elongate flexible member;
- a retention ring coupled to said mounting flange, said retention ring having an internally threaded surface;
- a first clamping member slidably coupled adjacent to said first end and along said top surface of said base member by a retention member having a threaded protrusion configured to pass through said elongate slot and engage a corresponding threaded aperture formed into said first clamping member; and
- a second clamping member coupled adjacent to said second end of said base member and along said top surface of said base member, wherein said first and second clamping members are configured to mechanically couple said base member to the camera.

12. An auxiliary lens positioning system as recited in claim 11, further comprising an auxiliary lens having an exterior threaded surface, said auxiliary lens threadably coupled to said retention ring.

13. An auxiliary lens positioning system as recited in claim 12, wherein said auxiliary lens is a multi-element lens assembly.

14. An auxiliary lens positioning system as recited in claim 12, wherein said auxiliary lens is configured to increase a field of view of the camera.

15. An auxiliary lens positioning system as recited in claim 11, further comprising said elongate flexible member having a plurality of ball and socket segments, wherein said plurality of ball and socket segments are interconnected such that a ball of one segment is inserted into a socket of an adjacent segment and frictional forces between an exterior surface area of said ball and an interior surface of said socket are sufficient to retain a relative position between said plurality of ball and socket segments.

16. An auxiliary lens positioning system as recited in claim 11, wherein said first and second clamping members have a V-shaped grove in opposing orientation, wherein said V-shaped grove centers the camera with respect to said auxiliary lens positioning.

* * * * *